United States Patent
Anandan et al.

(10) Patent No.: US 12,506,661 B2
(45) Date of Patent: Dec. 23, 2025

(54) AUTOMATED MODELING OF AN INDUSTRIAL NETWORK

(71) Applicant: Cisco Technology, Inc., San Jose, CA (US)

(72) Inventors: Swapna Anandan, Fremont, CA (US); Michael Freed, Pleasanton, CA (US); Akshay Khushu, San Jose, CA (US); Ruben Erick Escolero, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/231,372

(22) Filed: Aug. 8, 2023

(65) Prior Publication Data

US 2025/0055760 A1    Feb. 13, 2025

(51) Int. Cl.
*H04L 41/12*    (2022.01)
*H04L 41/14*    (2022.01)
*H04L 67/12*    (2022.01)

(52) U.S. Cl.
CPC ............ *H04L 41/12* (2013.01); *H04L 41/145* (2013.01); *H04L 67/12* (2013.01)

(58) Field of Classification Search
CPC ..... H04L 41/12; H04L 45/02; H04L 43/0817; H04L 41/145; H04L 67/12; H04L 63/104; H04L 41/08; H04L 63/0876
See application file for complete search history.

(56) References Cited

U.S. PATENT DOCUMENTS

| | | | |
|---|---|---|---|
| 7,698,415 B1 * | 4/2010 | Thompson | H04L 41/0853 709/224 |
| 10,097,585 B2 | 10/2018 | Bush et al. | |
| 10,122,589 B2 | 11/2018 | Yang et al. | |
| 10,148,519 B2 | 12/2018 | Dutta et al. | |
| 10,848,402 B1 * | 11/2020 | Haddow | H04L 43/50 |
| 11,489,780 B1 * | 11/2022 | Khosravi | H04L 47/762 |
| 2002/0124079 A1 * | 9/2002 | Pulsipher | H04L 69/324 709/224 |

(Continued)

FOREIGN PATENT DOCUMENTS

EP    2775685 A1    9/2014

OTHER PUBLICATIONS

TARMan: Topology-Aware Reliability Management for Softwarized Network Systems; Jun. 2017; p. 1-6, (Year: 2017).*

(Continued)

*Primary Examiner* — Tonia L Dollinger
*Assistant Examiner* — Linh T. Nguyen
(74) *Attorney, Agent, or Firm* — Lee & Hayes, P.C.

(57) ABSTRACT

In one embodiment, a process discovers network topology information of a particular computer network and creates a plurality of zones of devices in the particular computer network based on the network topology information. The process also discovers network communication activity patterns and endpoints of the particular computer network and creates a plurality of conduits between devices of the particular computer network based on the network communication activity patterns and endpoints of the particular computer network and association of the devices within the plurality of zones as described above.

20 Claims, 9 Drawing Sheets

(56) References Cited

U.S. PATENT DOCUMENTS

| | | | | |
|---|---|---|---|---|
| 2004/0109465 | A1* | 6/2004 | Kim | H04L 49/9021 |
| | | | | 370/419 |
| 2004/0264484 | A1* | 12/2004 | Kui | H04L 12/462 |
| | | | | 370/402 |
| 2014/0098713 | A1* | 4/2014 | Beckhardt | H04L 45/745 |
| | | | | 370/255 |
| 2014/0198793 | A1* | 7/2014 | Allu | H04L 69/14 |
| | | | | 370/392 |
| 2014/0258479 | A1* | 9/2014 | Tenginakai | H04L 41/0889 |
| | | | | 709/220 |
| 2015/0023150 | A1* | 1/2015 | Chen | H04L 41/0668 |
| | | | | 370/217 |
| 2015/0188767 | A1* | 7/2015 | Li | H04L 41/342 |
| | | | | 370/254 |
| 2016/0050225 | A1* | 2/2016 | Carpenter | G06F 21/577 |
| | | | | 726/25 |
| 2018/0367563 | A1* | 12/2018 | Pfleger de Aguiar | |
| | | | | G06F 21/577 |
| 2019/0089742 | A1* | 3/2019 | Hill | H04L 63/104 |
| 2021/0160174 | A1* | 5/2021 | Kashyap | H04L 45/22 |
| 2021/0168197 | A1* | 6/2021 | Jones | H04L 45/02 |
| 2021/0194932 | A1* | 6/2021 | Hill | H04L 63/0876 |
| 2021/0234792 | A1* | 7/2021 | Tamizkar | H04L 12/4641 |
| 2021/0351980 | A1* | 11/2021 | Huffman | H04L 63/1416 |
| 2021/0352110 | A1* | 11/2021 | Huffman | H04L 63/02 |
| 2023/0156031 | A1* | 5/2023 | Subramanian | H04L 63/14 |
| | | | | 726/25 |
| 2024/0214386 | A1* | 6/2024 | Barton | H04L 63/107 |

OTHER PUBLICATIONS

"Networking and Security in Industrial Automation Environments Design and Implementation Guide", online: https://www.cisco.com/c/en/us/td/docs/solutions/Verticals/Industrial_Automation/IA_Horizontal/DG/Industrial-AutomationDG/Industrial-AutomationDG.html, accessed Aug. 8, 2023, 251 pages, Cisco Systems, Inc.

* cited by examiner

AUTOMATED MODELING OF AN INDUSTRIAL NETWORK

TECHNICAL FIELD

The present disclosure relates generally to computer networks, and, more particularly, to the automated modeling of an industrial network.

BACKGROUND

Industrial networks are often built on the International Society of Automation (ISA) standards, such as the Purdue Model, which defines the best practices for the relationship between industrial control systems and business networks. The Purdue Model defines the reference model to create a boundary between the Information Technology (IT) portion of the network and the Operational Technology (OT) portion of the network at a Demilitarized Zone (DMZ), with the OT portion of the network divided into side-wide supervisory systems, local supervisory systems, and local controllers in charge of a process, cell, or line. At the lowest levels of the model are the sensors and actuators for that cell, line, or process.

The ISA has also developed and adopted a multi-part series of standards and technical reports about Industrial Automation and Control System (IACS) cyber security that have been published by the American National Standards Institute (ANSI). One such series of standard is the International Electrotechnical Commission (IEC) 62443 international series of standards that address cybersecurity for operational technology in automation and control systems. The IEC 62442 standard defines models for zones and for conduits in the industrial network. However, the underlying connectivity of the infrastructure of an industrial network is not dependent on the above models, and thus modeling an existing industrial network to such standards is not a trivial task.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a process discovers network topology information of a particular computer network and creates a plurality of zones of devices in the particular computer network based on the network topology information. The process also discovers network communication activity patterns and endpoints of the particular computer network and may then create a plurality of conduits between devices of the particular computer network based on the network communication activity patterns and endpoints of the particular computer network and association of the devices within the plurality of zones as described above.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
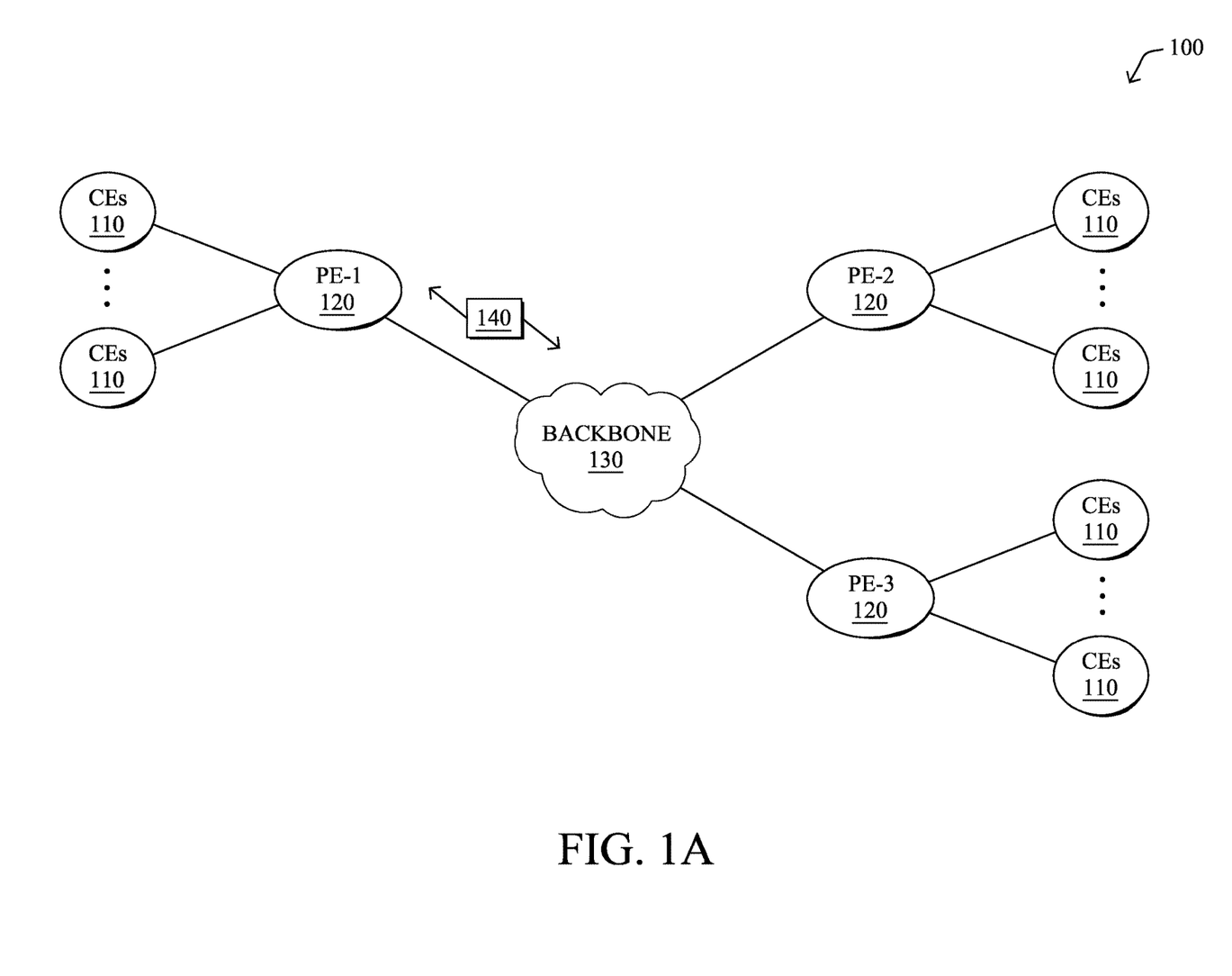
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

Figure 1B:
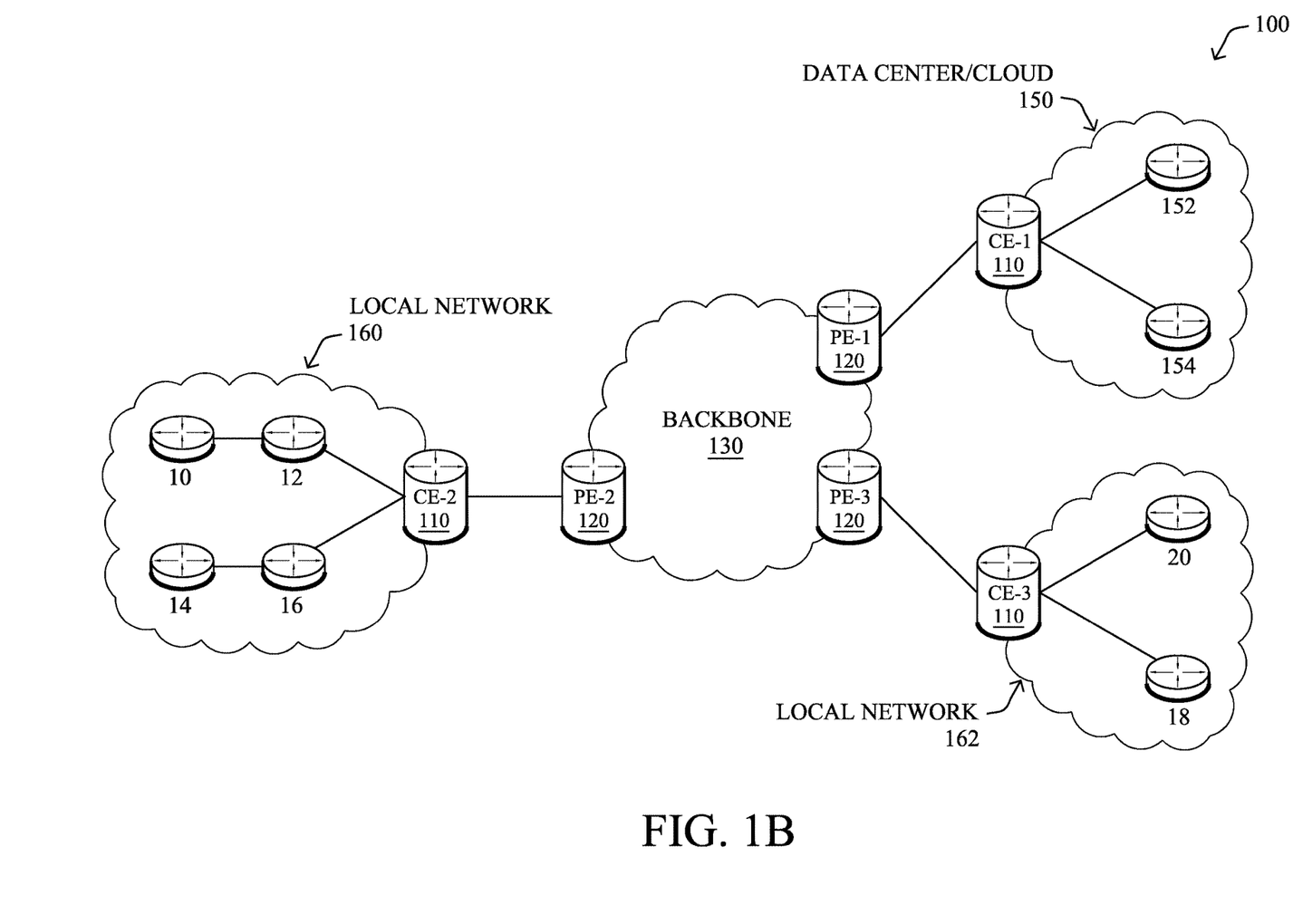

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QOS), security, network management, and traffic engineering extremely challenging, to mention a few.

Figure 2:
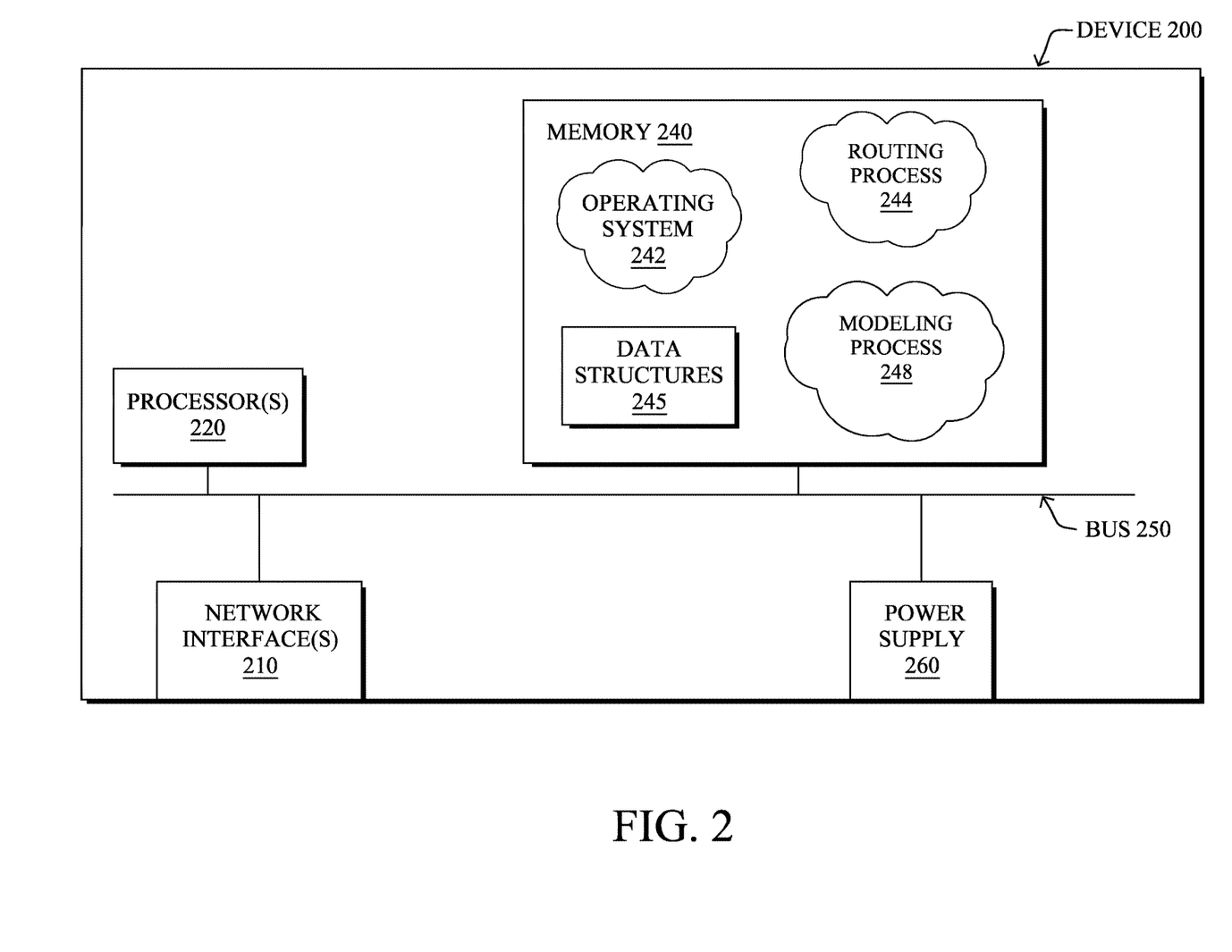
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, an automated modeling of an industrial network process 248 (or "modeling process," for brevity), as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Modeling process 248 (e.g., the automated modeling of an industrial network process) includes computer executable instructions that, when executed by processor(s) 220, cause device 200 to perform various operations and/or processes described in more detail in connection with FIGS. 3-6, herein.

Figure 3:
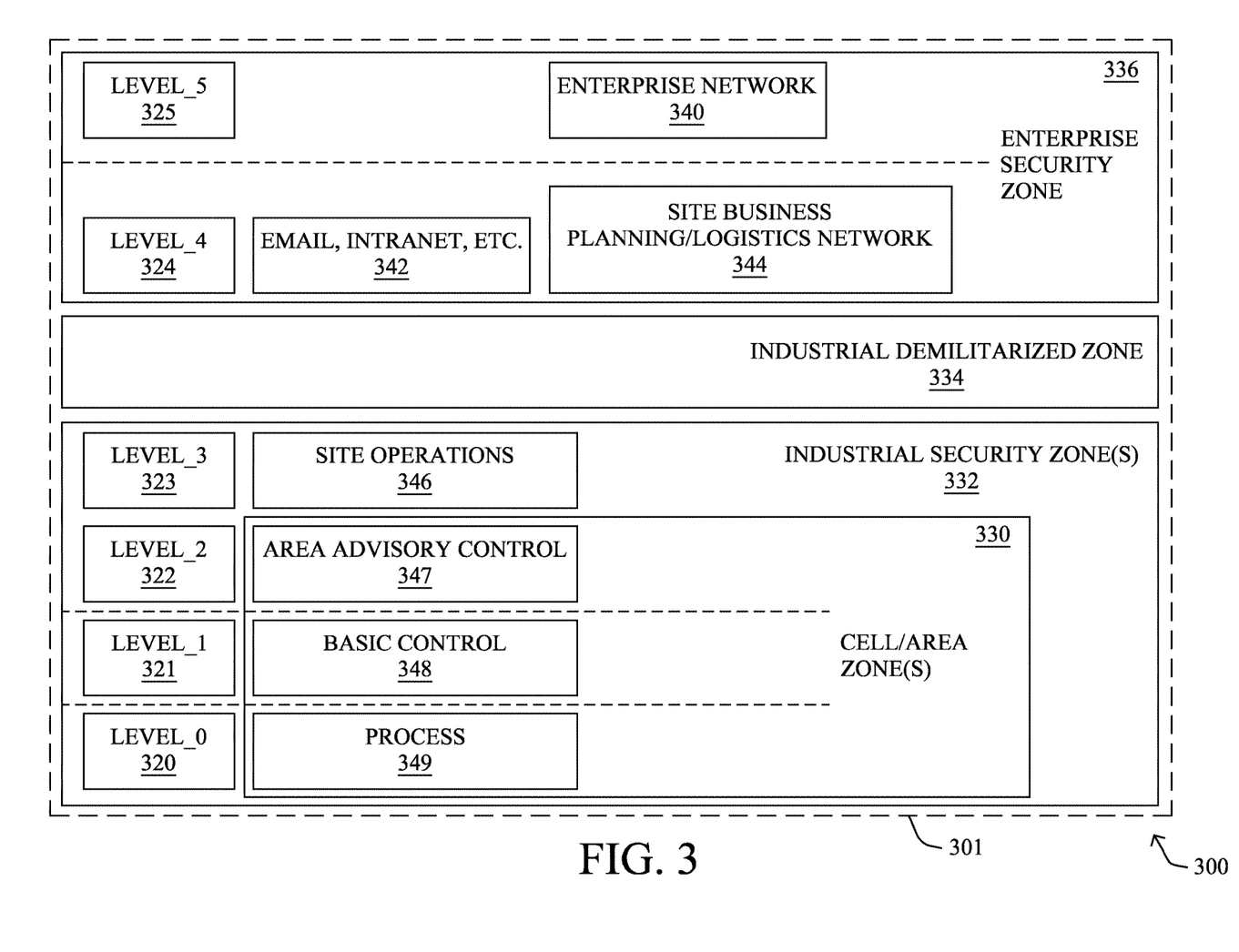
FIG. 3 illustrates an example model of an industrial network.

FIG. 3 illustrates an example model 300 of an industrial network 301. As will be appreciated, the example model 300 illustrated in FIG. 3 is a Purdue Model of an industrial network 301; however, it will be appreciated that other industrial network models known or to be developed may be utilized in accordance with the disclosure.

As shown in FIG. 3, the model 300 of the industrial network 301 includes multiple levels that correspond to multiple zones of the model 300. For example, the model 300 includes six levels: Level_0 320, Level_1 321, Level_2 322, Level_3 323, Level_4 324, and Level_5 325 and includes four zones: the Cell/Area Zone(s) 330, the Industrial Security Zone(s) 332, the Industrial Demilitarized Zone 334, and the Enterprise Security Zone 336.

Level_0 320 of the example model 300 may be referred to as the process 349 zone (or "physical process zone"). Although not shown so as to not obfuscate the drawing, it will be appreciated that Level_0 320 of the example model 300 contains sensors, actuators, drives, robots, and other machinery that are directly responsible for assembly, lubrication, and other physical processes associated with an industrial network. It will be further appreciated that many modern sensors communicate directly with monitoring software in the cloud via cellular networks.

Level_1 321 of the example model 300 may be referred to as the basic control 348 zone (or "intelligent devices zone"). In general, Level_1 321 contains instruments (e.g., programmable logic controllers (PLCs), remote terminal units (RTUs), etc.) that are configured to send commands to the sensors, actuators, drives, robots, and other machinery of Level_0 320. For example, instruments associated with Level_1 321 may provide batch control, discrete control, drive control, continuous process control, and/or safety control, among other possibilities, to the sensors, actuators, drives, robots, and other machinery of Level_0 320.

Level_2 322 of the example model 300 may be referred to as the area advisory control 347 zone (or "control systems zone") and contains systems that supervise, monitor, and control physical processes. Examples of such systems include supervisory control and data acquisition (SCADA) systems, which oversee and control physical processes, locally or remotely, and aggregates data to send to historians, distributed control systems (DCS), which perform SCADA functions but are usually deployed locally, and/or human-machine interfaces (HMIs), which connect to DCS and PLCs to allow for basic controls and monitoring. For example, Level_2 322 may provide one or more clients (e.g., FactoryTalk® clients) that communicate via an operator interface and/or engineering workstation with the instruments of Level_1 321.

Level_3 323 of the example model 300 may be referred to as the site operations 346 zone (or "manufacturing operations systems zone") and contains customized operational technology (OT) devices that manage production workflows on the shop floor. Examples of such devices include manufacturing operations management (MOM) systems to manage production operations, manufacturing execution systems (MES) to collect real-time data to help optimize production, and/or data historians to store process data and/or perform contextual analysis. For example, Level_3 323 may include one or more FactoryTalk® applications servers, FactoryTalk® directories, engineering workstations, and/or remote access servers to manage production workflows on the shop floor.

The Industrial Demilitarized Zone 334 (DMZ), which is sometimes referred to as "Level_3.5" of the example model 300 includes security systems such as firewalls and proxies that are used in an effort to prevent lateral threat movement between information technology (IT), which is described in more detail below, and OT. For example, the DMZ 334 may include one or more remote gateway services, application mirrors, patch management systems, web service operations systems, reverse proxies, antivirus servers, etc. to prevent lateral threat movement between IT and OT.

Level_4 324 and Level_5 325 of the example model 300 are located in the Enterprise Security Zone 336, which houses a typical IT network. As will be appreciated, the Enterprise Security Zone 336 is where the primary business functions occur, including the orchestration of manufacturing operations. Enterprise resource planning (ERP) systems here drive plant production schedules, material use, shipping, and inventory levels. For example, Level_4 324 may include a site planning/logistics network 344 and various servers to provides email, intranet, etc. (as shown at box 342), while Level_5 325 may include and enterprise network 340. Although not explicitly shown in FIG. 3, Level_4 324 and/or Level_5 325 may include personal computers, web servers, mail servers, and/or domain name system (DNS) servers.

As noted above, mapping an industrial network and, more particularly, an existing industrial network, to a standardized model (e.g., a Purdue Model or other such model) is challenging because the underlying connectivity of the infrastructure of an existing industrial network is generally not dependent on a standardized model. However, many existing industrial networks are in operation and therefore it is beneficial to provide a methodology to map such industrial networks to a standardized model.

—Automated Modeling of an Industrial Network—

The techniques herein allow for the automated mapping of an industrial network to a standardized zone and/or conduit model. As mentioned above, an example standardized zone and/or conduit model can be an IEC-62443 model, although embodiments are not so limited. In contrast to previous approaches, it is noted that at least some embodiments of the present disclosure allow for the automated mapping of an existing industrial network to a standardized zone and/or conduit model.

Specifically, according to one or more embodiments of the disclosure, a process described in greater detail herein discovers network topology information of a particular computer network, and creates a plurality of zones of devices in the particular computer network based on the network topology information. The process also discovers network communication activity patterns and endpoints of the particular computer network, and may then create a plurality of conduits between devices of the particular computer network based on the network communication activity patterns and endpoints of the particular computer network and association of the devices within the plurality of zones as described above.

Illustratively, the techniques described herein may be performed by hardware, software, and/or firmware, such as in accordance with the modeling process 248, which may include computer executable instructions executed by the processor 220 (or independent processor of interfaces 210) to perform functions relating to the techniques described herein, e.g., in conjunction with routing process 244 or collaboratively with other processes on other devices, and so on.

Figure 4A:
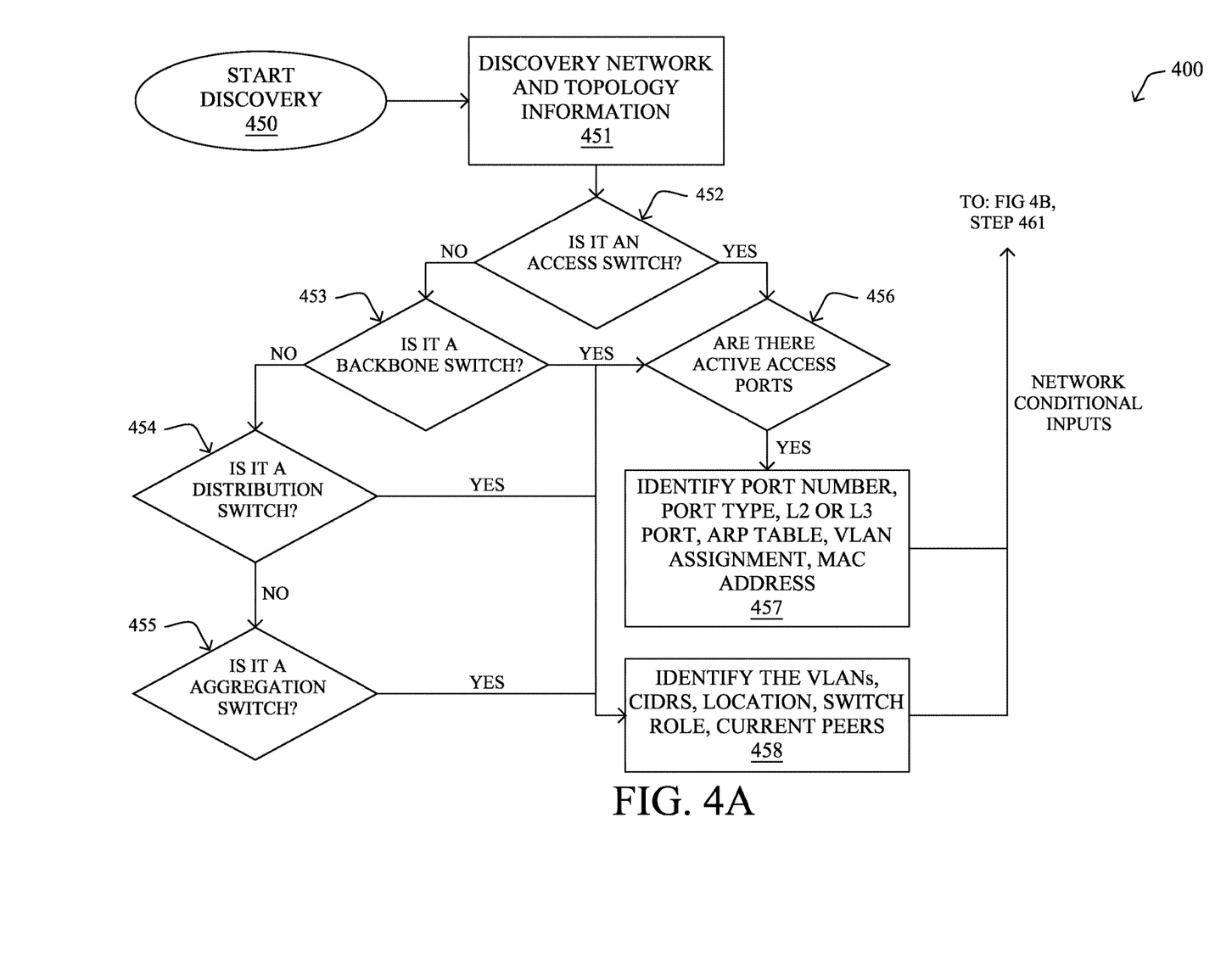
FIGS. 4A-4B illustrate an example flow for modeling an existing industrial network to a standardized zone model.
Figure 4B:
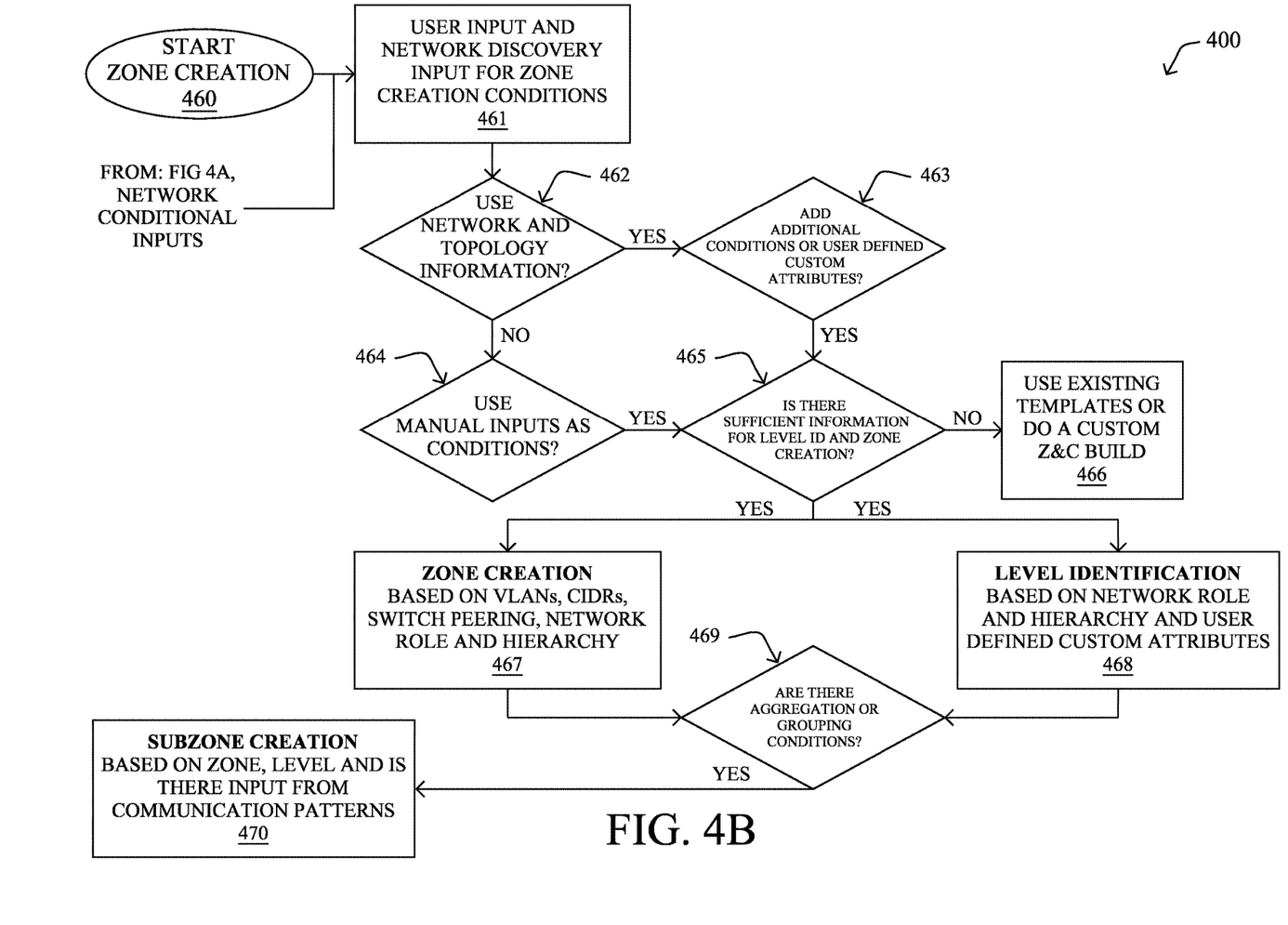

Operationally, FIGS. 4A-4B illustrates an example flow 400 for modeling an existing industrial network to a standardized zone model, according to one or more embodiments of the present disclosure. As discussed herein, the modelling (or "mapping") of the existing industrial network (e.g., the industrial network 301 of FIG. 3) can include automated creation, modelling, and/or mapping of functional logic areas (e.g., the cell/zone area 330 and/or the industrial security zone(s) 332 of FIG. 3) of the existing industrial network.

As shown in FIG. 4A, at operation 450, a discovery process is initiated. The discovery process can, at operation 451, include discovery of network and topology information. In some embodiments, the network and topology information is associated with an existing industrial network and is performed to identify devices in the existing industrial network.

At operation 452, it is determined, based on the discovered network and topology information, if an identified device in the existing industrial network is an access switch. If the identified device is an access switch, the flow 400 continues to operation 456 where it is determined if the access switch has any active access ports. If the access switch has any active ports, the flow 400 continues to operation 457 where a port number, port type, L2 or L3 port, address resolution protocol (ARP) table, virtual local area network (VLAN) assignment, and/or media access control (MAC) address of the access switch are identified.

If, however, the identified device is not an access switch, the flow 400 continues to operation 453 where it is determined, based on the discovered network and topology information, if the identified device in the existing industrial network is a backbone switch. If the identified device is a backbone switch, the flow 400 continues to operation 456 where it is determined if the backbone switch has any active access ports. If the backbone switch has any active ports, the flow 400 continues to operation 457 where a port number, port type, L2 or L3 port, address resolution protocol (ARP) table, virtual local area network (VLAN) assignment, and/or media access control (MAC) address of the backbone switch are identified. In addition, if the identified device is a backbone switch, the flow 400 continues to operation 458 (regardless of whether the backbone switch has any active ports) where VLANs, classless inter-domain routing(s) (CIDR), a physical location of the distribution switch, a role of the distribution switch, and/or current peers of the backbone switch are identified.

If, however, the identified device is not a backbone switch, the flow 400 continues to operation 454 where it is determined, based on the discovered network and topology information, if the identified device in the existing industrial network is a distribution switch. If the identified device is a distribution switch, the flow 400 continues to operation 458 where VLANs, classless inter-domain routing(s) (CIDR), a physical location of the distribution switch, a role of the distribution switch, and/or current peers of the distribution switch are identified.

If, however, the identified device is not a distribution switch, the flow 400 continues to operation 455 where it is determined, based on the discovered network and topology information, if the identified device in the existing industrial network is an aggregation switch. If the identified device is an aggregation switch, the flow 400 continues to operation 458 where VLANs, classless inter-domain routings (CIDRS), a physical location of the aggregation switch, a role of the aggregation switch, and/or current peers of the aggregation switch are identified.

Once the above-described identification operations are performed, at operation 460 a zone creation process is initiated. As shown in FIG. 4B, the information from operation 457 and/or operation 458 may be used as network conditional inputs for operation 461 where user input(s) and/or the network discovery input(s) are used as conditions for the zone creation process.

At operation 462, a determination is made as to whether the network topology information will be used for the zone creation process. If it is determined at operation 462 that the network topology information will be used for the zone creation process, the flow 400 continues to operation 463 where it is determined whether additional conditions or user defined attributes will be used for the zone creation process. If additional conditions or user defined attributes will be used for the zone creation process, the flow 400 continues to operation 465 where a determination is made as to whether there is sufficient information available to the zone creation process for level identification (e.g., the levels of the network described in FIG. 3) and zone creation.

If, at operation 462, it is determined that the network topology information will not be used for the zone creation process, the flow 400 continues to operation 464, where it is determined that manual inputs (e.g., from a user or administrator of the network) will be used for the zone creation process. In these embodiments, the flow 400 continues to operation 465 where a determination is made as to whether there is sufficient information available to the zone creation process for level identification (e.g., the levels of the network described in FIG. 3) and zone creation.

In any event, if it is determined at operation 465 that there is insufficient information available to the zone creation process for level identification and zone creation, the flow 400 continues to operation 466 where the zone creation process uses existing templates and/or requires a customized zone and conduit (Z&C) build.

If, however, it is determined at operation 465 that there is sufficient information available to the zone creation process for level identification and zone creation, the flow 400 continues to operation 467, where a zone creation operation is performed using VLAN information, CIDR, switch peering information, network role information, network hierarchy information, etc. In addition, if it is determined at operation 465 that there is sufficient information available to the zone creation process for level identification and zone creation, the flow 400 continues to operation 468 where a level identification operation is performed using network role information, network hierarchy information, and/or user defined custom attributes, etc.

The flow 400 then continues from operation 467 and operation 468 to operation 469 where it is determined whether any aggregation and/or grouping conditions are observed in the network (e.g., the existing industrial network). If aggregation and/or grouping conditions are observed in the network, the flow 400 continues to operation 470 where one or more sub-zones are created based on zone information, level information, and/or whether any input from communication patterns associated with devices in the network is available.

In some embodiments, various criteria can be associated with the zone creation process illustrated in FIG. 4B. For example, when generating the zones of the existing industrial network to create a mapping thereof, the following criteria can, in some embodiments, be employed. All assets which belong to the same VLAN and connected to the same access switch can form a zone. All assets which belong to the same VLAN and are connected to one or more access switch peers which are in turn connected to a common aggregation switch can form a zone. All assets in the same VLAN across the same aggregation layer within a distribution layer can form a zone. Assets within one or more VLANs which are connected to an access switch can form a zone.

Further, in some embodiments, all assets with one or more VLANs which are connected to multiple access switches which have a common aggregation switch can form a zone. All assets within a subnet and/or CIDR block can form a Layer 3 zone (e.g., can be associated with Level_3 323 illustrated in FIG. 3). All assets within a subnet that have specific destination routes allowed as per the security policy requirements can be placed in a zone. All assets connected to a network with one or more access switches within an Aggregation network can form a zone. In addition, in some embodiments, all assets connected to a network with one or more access and aggregation layer switches within a distribution network can form a zone. Further, all the assets connected to switches in the same location can form a zone.

In some embodiments, a network administrator can manually create a logical zone and move assets into said logical zone based on the network design. All assets can be added to a logical zone which have common attributes assigned during manufacturing such as vendor name, make, model. All assets that belong to the same physical location in the plant floor can belong to a zone. All assets with network administrator defined attributes or functional attributes such as tags to group based on a specific task or security requirement such as all safety PLCs can be placed in a safety zone (e.g., the Industrial Security Zone 332 of FIG. 3).

In some embodiments, various criteria can be associated with the level creation process illustrated in FIGS. 4A-4B. For example, when generating the levels of the existing industrial network to create a mapping thereof, the following criteria can, in some embodiments, be employed. If an asset or a service crosses the DMZ boundary (e.g., the Industrial Demilitarized Zone 334 of FIG. 3) to an external vendor or cloud service, it can be placed in Level 5 zone (e.g., Level_5 325 of FIG. 3) or an "External Zone" in the example model 300 illustrated in FIG. 3.

In addition, if an asset or a service is connected via a backbone and/or core switch to cross the DMZ boundary to reach enterprise IT services such as intranet, monitoring, etc., such asset or service can be placed in Level 4 zone (e.g., Level_4 324 of FIG. 3) or an "Enterprise Zone."

If an asset or operator or Human-Machine Interface (HMI) service is connected to the distribution switch or in a collapsed Core/Distribution switch, such asset, operator, or HMI can be placed in the Level 3 zone (e.g., Level_3 323 of FIG. 3) or and "Industrial Operational Management Supervisory Zone."

If an asset or a control service is connected to the aggregation switch it can be placed in the Level 2 zone (e.g., Level_2 322 of FIG. 3) or "Basic Control Zone."

If an asset or sensor is connected to the access switch it can be placed in the Level 0 zone or Level 1 zone (e.g., Level_0 320 or Level_1 321 of FIG. 3) or "Process Zone."

In some embodiments, various criteria can be associated with the sub-zone creation process illustrated in FIGS. 4A-4B. For example, when generating the sub-zones of the existing industrial network to create a mapping thereof, the following criteria can, in some embodiments, be employed. If one or more assets have a similar security policy requirement, they can be placed in a sub-zone within the parent zone. If one or more assets belong to a VLAN which are part of the same access or aggregation switch which is serving more than one VLAN, each VLAN can be identified as a sub-zone.

Figure 5A:
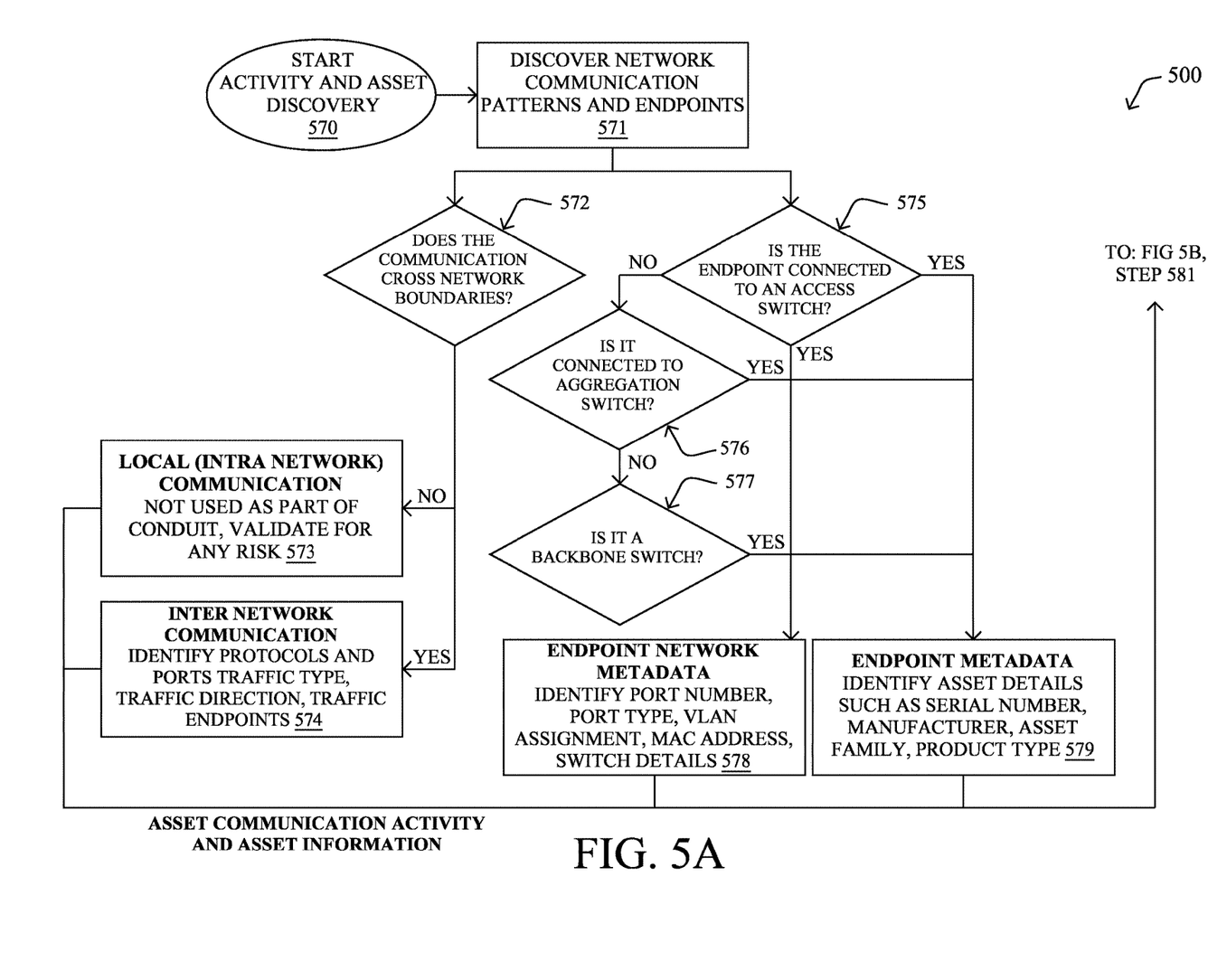
FIGS. 5A-5B illustrate an example flow for modeling an existing industrial network to a standardized conduit model.
Figure 5B:
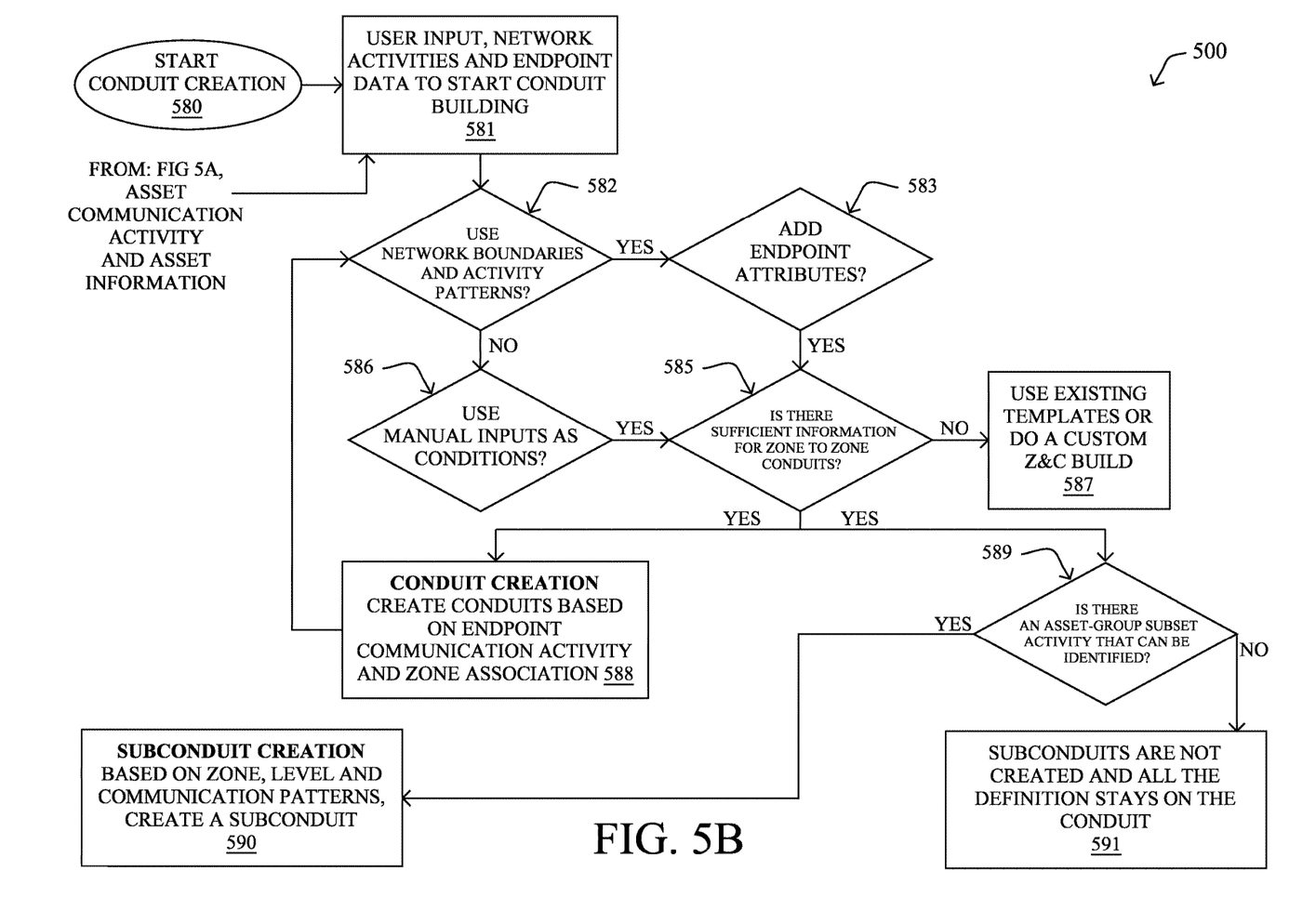

FIGS. 5A-5B illustrate an example flow 500 for modeling an existing industrial network to a standardized conduit model. That is, in addition to mapping the various devices to zones, sub-zones, and/or levels of the standardized model, as discussed in connection with FIGS. 4A-4B, embodiments of the present disclosure further allow for the conduits between such local groupings to be modelled (or "mapped"). Similar to the processes discussed in connection with FIGS. 4A-4B, herein, the modelling (or "mapping") of conduits of the existing industrial network (e.g., the industrial network 301 of FIG. 3) can include automated creation, modelling, and/or mapping of conduits of the existing industrial network.

As shown in FIG. 5A, at operation 570 an activity and asset discovery process is initiated. In some embodiments, the activity and assets are associated with an existing industrial network and the activity and asset discovery process is performed to identify assets and/or activity, such as the use of such assets, in the existing industrial network. The flow 500 continues to operation 571 where network (e.g., existing industrial network) communication patterns and/or endpoints are discovered.

In some embodiments, the flow 500 then continues to operation 572 where it is determined if communications discovered in connection with operation 571 cross a network boundary. If a communication that was discovered in connection with operation 571 does not cross a network boundary, at operation 573 it is determined that the communication is a local (e.g., a local intranet) communication and therefore does not involve a conduit. In some embodiments, however, such communications may be validated at operation 573 to assess whether there is a risk associated with the communication.

In contrast, if a communication that was discovered in connection with operation 571 does cross a network boundary, at operation 574 it is determined that the communication is an inter network communication. In response to this determination, at operation 574 protocols associated with the communication, ports associated with the communication, a traffic type associated with the communication, a traffic direction associated with the communication, and/or endpoints associated with the communication, etc. may be identified.

In any event, the determinations and/or information identified in connection with operation 573 and operation 574 is provided for use in operation 581 (discussed in more detail below) as asset communication activity and asset information.

Returning briefly to operation 571, the flow 500 may also continue to operation 575 where it is determined if a discovered endpoint is connected to an access switch. If the discovered endpoint is not connected to an access switch, the flow 500 continues to operation 576 where it is determined if the endpoint is connected to an aggregation switch. If the discovered endpoint is not connected to an aggregation switch, the flow 500 continues to operation 577 where it is determined if the endpoint is connected to a backbone switch.

As shown in FIG. 5A, responsive to an affirmative decision at operation 575, operation 576, or operation 577, the flow 500 continues to operation 578 and operation 579. At operation 578, port numbers, port types, VLAN assignments, MAC addresses, and/or switch details are identified to generate endpoint network metadata for the switch type that was identified at operation 575, operation 576, or operation 577. In addition, at operation 579, asset details, such as serial numbers, manufacturer information, asset family details, and/or product types, etc. are identified to generate endpoint metadata for the switch type that was identified at operation 575, operation 576, or operation 577. As shown in FIG. 5A, the information identified at operation 578 and operation 579 is provided for use in operation 581 (discussed in more detail below) as asset communication activity and asset information.

Continuing to FIG. 5B, at operation 580, a conduit creation process is initialized. As shown in FIGS. 4A-4B, the asset communication activity and asset information from operation 573, operation 574, operation 578, and/or operation 579 may be used as inputs for operation 581 where user input(s), network activities, and endpoint data are used as conditions for the conduit creation process.

As shown in FIG. 5B, the flow 500 continues to operation 582 where a determination as to whether network boundaries and/or activity patterns are to be used in the conduit creation process. If it is determined that network boundaries and/or activity patterns are not to be used in the conduit creation process, the flow 500 continues to operation 586 where it is determined whether manual inputs (e.g., inputs from a network administrator) are to be used in the conduit creation process.

If, however, it is determined that network boundaries and/or activity patterns are to be used in the conduit creation process, the flow 500 continues to operation 583 where it is determined if endpoint attributes (e.g., the information identified at operation 578 and operation 579) are to be considered in the conduit creation process. If the endpoint attributes are determined to be considered in the conduit creation process, the flow 500 continues to operation 585 (described in more detail below in connection with an affirmative decision at operation 586).

Continuing on, if (1) it is determined that manual inputs are to be used in the conduit creation process at operation 586 and/or (2) it is determined that the endpoint attributes are to be considered in the conduit creation process at operation 583, the flow 500 continues to operation 585 where a determination is made as to whether there is sufficient information regarding zone-to-zone conduits to proceed with the conduit creation process. If there is not sufficient information regarding zone-to-zone conduits to proceed with the conduit creation process, the flow 500 continues to operation 587 where the conduit creation process uses existing templates and/or requires a customized zone and conduit (Z&C) build.

If, however, it is determined at operation 585 that there is sufficient information regarding zone-to-zone conduits to proceed with the conduit creation process, the flow 500 continues to operation 588 where conduits can be created based on the endpoint communication information activity and/or zone associations involving the assets. In such embodiments, the flow may continue back to operation 582 as needed until the conduit creation process is completed.

In the alternative, or in addition, if it is determined at operation 585 that there is sufficient information regarding zone-to-zone conduits to proceed with the conduit creation process, the flow 500 continues to operation 589 where it can be determined if there is any asset sub-group information that can be identified. If there is asset sub-group information that can be identified, the flow 500 continues to operation 590 where sub-conduits may be created based on zones associated with the assets, levels associated with the assets, and/or communication patterns associated with the assets, etc. If, however, there is not asset sub-group information that can be identified, the flow 500 continues to operation 591 where sub-conduits are not created as part of the conduit creation process.

In some embodiments, various criteria can be associated with the conduit creation process illustrated in FIGS. 5A-5B. For example, when generating the conduits of the existing industrial network to create a mapping thereof, the following criteria can, in some embodiments, be employed. If two (or more) assets in the same logical zone communicate with one another, the activity is recorded as intra-zone activity but not added to the conduit policy. If two (or more) assets in different logical zones communicate with one another, then the activity may be analyzed to gather more information such as the industrial protocol used, the ports, the direction of the traffic flow. In some embodiments, when detailed activity between two (or more) assets from different zones is gathered, such information may be added to the conduit policy between the two (or more) zones.

With respect to creation of sub-conduits (e.g., at operation 590), in some embodiments, if an asset from a logical sub-zone communicates to another logical one or its associated sub-zone, then the activity may be added to the subzone conduit policy. In some embodiments, the result of this processing can correspond to a mapping of the configured industrial network to a standardized zone and conduit mode. This standardized zone and conduit mode can then be displayed (e.g., via a graphical user interface) to a network administrator or other user of the existing industrial network.

Notably, while FIGS. 4A-5B above demonstrate specific examples of modeling an industrial network, the embodiments herein are not so limited in terms of steps, the order of the steps, or the specific associations made therein. Said differently, while the procedures 400-500 described above with reference to FIGS. 4A-5B are directed to specific embodiments, these are merely example implementations of the techniques herein, and are not meant to limit the scope of the present disclosure.

Figure 6:
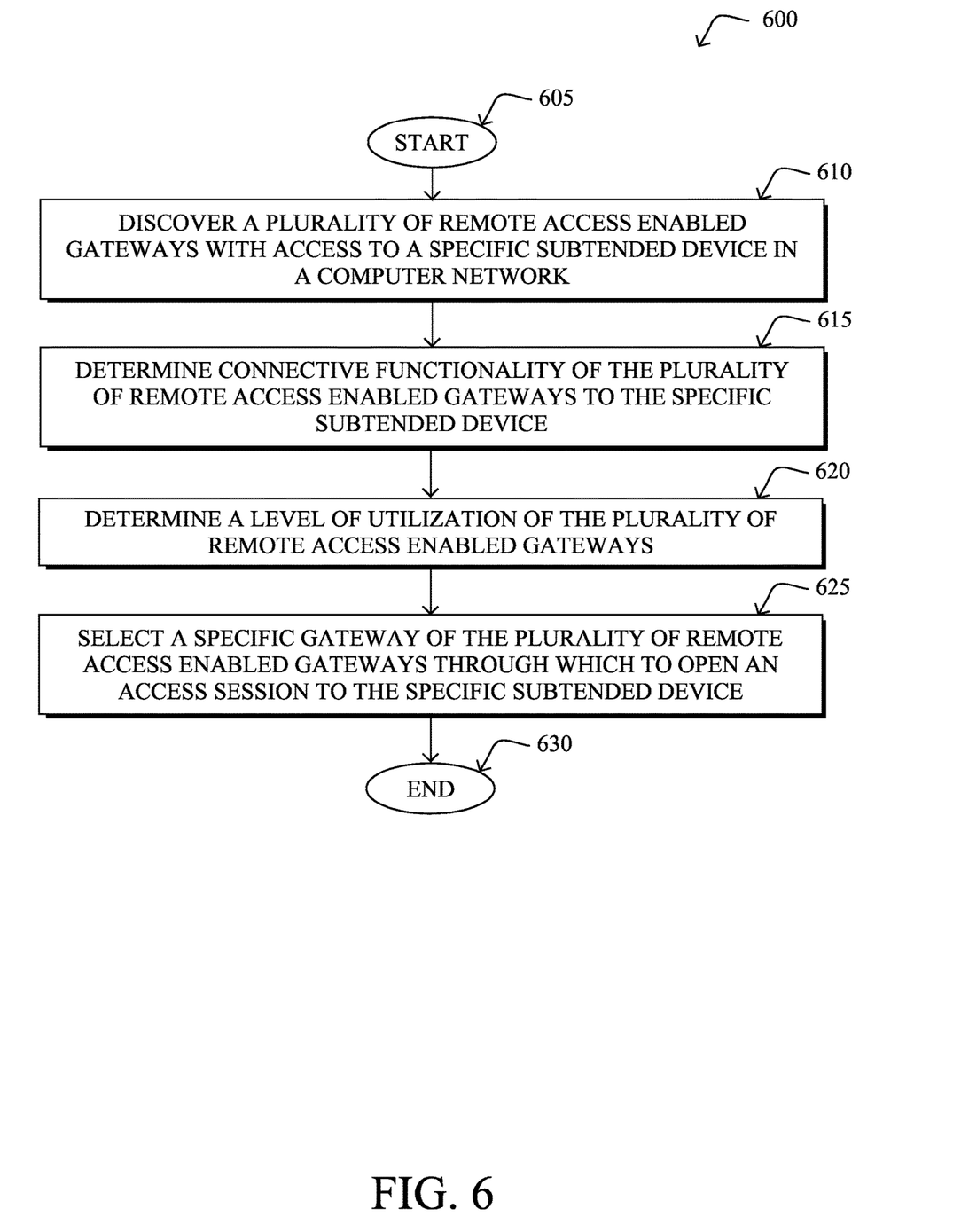
FIG. 6 illustrates an example simplified procedure for automated modeling of an industrial network.

In particular, FIG. 6 illustrates an example simplified procedure for automated modeling of an industrial network in accordance with one or more embodiments described herein. For example, a non-generic, specifically configured device (e.g., device 200 or apparatus) may perform procedure 600 (e.g., a method) by executing stored instructions (e.g., process 248). The procedure 600 may start at step 605, and continues to step 610, where, as described in greater detail above, a process discovers network topology information of a particular computer network. As discussed above, the particular computer network may be an industrial network, although embodiments are not so limited.

In various embodiments, discovering the network topology information may include learning of switches and identifying the switches respectively as one of either an access switch, a backbone switch, a distribution switch, or an aggregation switch. In such embodiments, the process may, for each of the switches that is an access switch, identify a port number, a port type, a L2 or L3 port, an address resolution protocol table, virtual local area network assignments, and/or a media access control address, as discussed above in connection with FIGS. 4A-5B. Further, in some embodiments, the process may, for each of the switches that is either a backbone switch, a distribution switch, or an aggregation switch, identify virtual local area network assignments, classless inter-domain routing information, location information, switch role information, and/or current peers associated with the switch, as discussed above in connection with FIGS. 4A-5B.

At step 615, as detailed above, the process creates a plurality of zones of devices in the particular computer network based on the network topology information. In some embodiments, the process can supplement the network topology information with user inputs. Further, in various embodiments, the plurality of zones may be created based on one or more of: virtual local area network information; classless inter-domain routing information; switch peering information; network role information; and hierarchy information.

At step 620, as detailed above, the process discovers network communication activity patterns and endpoints of the particular computer network. In some embodiments, the process can supplement the network communication activity patterns and endpoints with user inputs.

At step 625, as detailed above, the process creates a plurality of conduits between devices of the particular computer network based on the network communication activity patterns and endpoints of the particular computer network and association of the devices within the plurality of zones as described above. As discussed above, the plurality of zones and the plurality of conduits may conform to a Purdue Model, although embodiments are not so limited.

In various embodiments, the process further identifies one or more levels within one or more of the plurality of zones based at least on network roles and hierarchy of the devices. In such embodiments, the one or more levels may be identified further based on user-defined custom attributes.

In some embodiments, the plurality of conduits may be created based on whether certain of the network communication activity patterns are determined to cross network boundaries. Embodiments are not so limited, however, and in some embodiments, the plurality of conduits are created based on whether endpoints are connected to one of either an access switch, an aggregation switch, or a backbone switch.

The procedure 600 may further include creating one or more sub-conduits based on the network communication activity patterns. In some embodiments, the one or more sub-conduits may be created based on identifying asset group subset activity. The procedure 600 may further include creating one or more sub-zones in response to groupings of devices.

Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while FIGS. 4A-5B and FIG. 6 are described separately, certain steps from each of the procedures 400-600 may be included within other procedures, and they need not be mutually exclusive of one another.

The techniques described herein, therefore, allow for the automated mapping of an industrial network and, more particularly, to an existing industrial network, to a standardized zone and/or conduit model. As mentioned above, an example standardized zone and/or conduit model can be an IEC-62443 model, although embodiments are not so limited. The techniques described herein can allow for administrators of the industrial network to be provided with valuable information regarding the underlying connectivity of the industrial network infrastructure, which is generally not dependent on a standardized model. In addition, by providing a methodology to map an existing industrial network to a standardized model, costs associated with building a modellable industrial network from scratch are saved.

While there have been shown and described illustrative embodiments that provide for automated modeling of an industrial network, it is to be understood that various other adaptations and modifications may be made within the spirit and scope of the embodiments herein. For example, while certain embodiments are described herein with respect to using certain models, operations, and/or processes for purposes of automated modeling of an industrial network, the models, operations, and/or processes are not limited as such and may be used for other functions, in other embodiments. In addition, while certain protocols, standards and associated terminology are shown and described, other suitable protocols, standards and associated terminology may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having computer-executable program instructions stored thereon that execute on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
discovering, by a process, network topology information of a particular computer network;
creating, by the process, a plurality of zones of devices in the particular computer network based on the network topology information;
identifying, by the process, one or more levels within one or more of the plurality of zones based at least on network roles and hierarchy of the devices;
discovering, by the process and based on port-level information gathered from the particular computer network, network communication activity patterns and endpoints of the particular computer network;
creating, by the process, a plurality of conduits between devices of the particular computer network based on the network communication activity patterns and endpoints of the particular computer network and associations among the devices within the plurality of zones; and
creating, by the process, one or more sub-conduits based on the network communication activity patterns,
wherein the plurality of zones, the one or more levels, the plurality of conduits, and the one or more sub-conduits thereby establish an automated model of the particular computer network based on a discovery process.

2. The method as in claim 1, wherein the one or more levels are identified further based on user-defined custom attributes.

3. The method as in claim 1, wherein the plurality of conduits are created based on whether certain of the network communication activity patterns are determined to cross network boundaries.

4. The method as in claim 1, wherein the plurality of conduits are created based on whether endpoints are connected to one of either an access switch, an aggregation switch, or a backbone switch.

5. The method as in claim 1, wherein the one or more sub-conduits are created based on identifying asset group subset activity.

6. The method as in claim 1, wherein the plurality of zones are created based on one or more of: virtual local area network information; classless inter-domain routing information; switch peering information; network role information; and hierarchy information.

7. The method as in claim 1, further comprising:
creating one or more sub-zones in response to groupings of devices.

8. The method as in claim 1, wherein discovering network topology information comprises:
learning of switches and identifying the switches respectively as one of either an access switch, a backbone switch, a distribution switch, or an aggregation switch.

9. The method as in claim 8, further comprising, for each of the switches that is an access switch:
identifying one or more of: port number; port type; L2 or L3 port; address resolution protocol table; virtual local area network assignments; and media access control address.

10. The method as in claim 8, further comprising, for each of the switches that is either a backbone switch, a distribution switch, or an aggregation switch:
identifying one or more of: virtual local area network assignments; classless inter-domain routing information; location; switch role; and current peers.

11. The method as in claim 1, wherein the plurality of zones and the plurality of conduits conform to a Purdue Model.

12. The method as in claim 1, wherein the particular computer network is an industrial network.

13. The method as in claim 1, further comprising:
supplementing the network topology information with user inputs.

14. The method as in claim 1, further comprising:
supplementing the network communication activity patterns and endpoints with user inputs.

15. The method as in claim 1, wherein the automated model comprises a cybersecurity model.

16. An apparatus, comprising:
one or more network interfaces to communicate with a network;
a processor coupled to the one or more network interfaces and configured to execute one or more processes; and
a memory configured to store a process that is executable by the processor, the process, when executed, configured to:
discover, by the process, network topology information of a particular computer network;
create, by the process, a plurality of zones of devices in the particular computer network based on the network topology information;
identify, by the process, one or more levels within one or more of the plurality of zones based at least on network roles and hierarchy of the devices;
discover, by the process and based on port-level information gathered from the particular computer network, network communication activity patterns and endpoints of the particular computer network;
create, by the process, a plurality of conduits between devices of the particular computer network based on the network communication activity patterns and endpoints of the particular computer network and associations among the devices within the plurality of zones; and
create, by the process, one or more sub-conduits based on the network communication activity patterns,
wherein the plurality of zones, the one or more levels, the plurality of conduits, and the one or more sub-conduits thereby establish an automated model of the particular computer network based on a discovery process.

17. The apparatus as in claim 16, wherein the automated model comprises a cybersecurity model.

18. A tangible, non-transitory, computer-readable medium having computer-executable instructions stored thereon that, when executed by a processor on a computer, cause the computer to perform a method comprising:
discovering network topology information of a particular computer network;
creating a plurality of zones of devices in the particular computer network based on the network topology information;
identifying one or more levels within one or more of the plurality of zones based at least on network roles and hierarchy of the devices;
discovering, based on port-level information gathered from the particular computer network, network communication activity patterns and endpoints of the particular computer network;
creating a plurality of conduits between devices of the particular computer network based on the network communication activity patterns and endpoints of the particular computer network and associations among the devices within the plurality of zones; and creating one or more sub-conduits based on the network communication activity patterns, wherein the plurality of zones, the one or more levels, the plurality of conduits, and the one or more sub-conduits thereby establish an automated model of the particular computer network based on a discovery process.

19. The tangible, non-transitory, computer-readable medium as in claim 18, wherein the method further comprises:

identifying one or more levels within one or more of the plurality of zones based at least on network roles and hierarchy of the devices.

20. The tangible, non-transitory, computer-readable medium as in claim 18, wherein the automated model comprises a cybersecurity model.

\* \* \* \* \*